Oct. 6, 1931.  E. H. COQUILLE  1,825,940
LUGGAGE AND LIKE CARRIER FOR MOTOR VEHICLES
Filed April 8, 1929  2 Sheets-Sheet 1

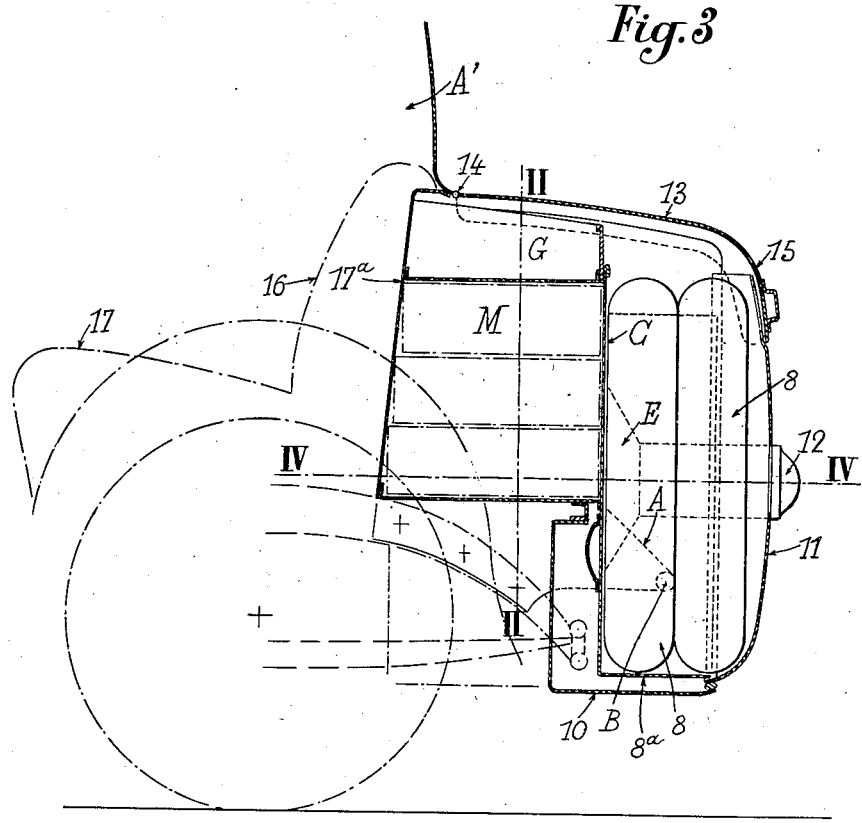
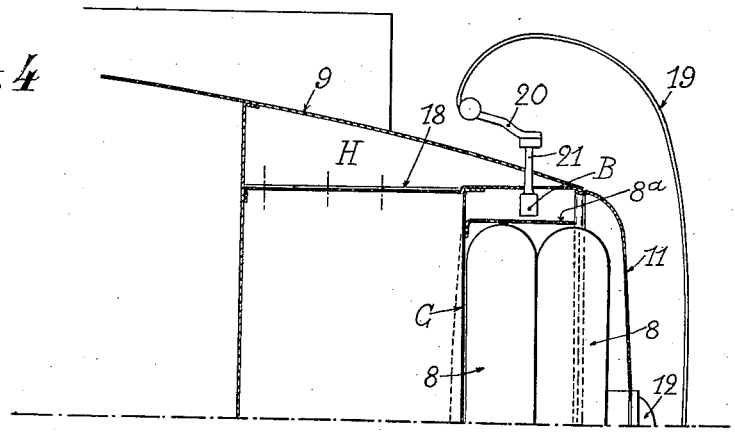

Patented Oct. 6, 1931

1,825,940

UNITED STATES PATENT OFFICE

EMILE HENRI COQUILLE, OF PARIS, FRANCE, ASSIGNOR TO SOCIETE ANONYME DES USINES CHAUSSON, OF ASNIERES, FRANCE

LUGGAGE AND LIKE CARRIER FOR MOTOR VEHICLES

Application filed April 8, 1929, Serial No. 353,638, and in France May 5, 1928.

This invention relates to various improvements in luggage and like carriers for motor vehicles of the type in which the rear wall or panel of the valise holding box or trunk, which serves as a support for a number of accessory parts, is adapted to pivot about a horizontal axis.

According to the present invention, the valise-holding box or trunk and the accessory parts mounted on its rear balanced and rocking panel are disposed within the interior of a second or main box forming part of the vehicle body, the said valise-holding box being however mounted upon supports secured to the vehicle frame.

The disposition of the main box or case forming part of the vehicle body is such that it will afford a ready access to the valises and the spare wheels.

Further characteristic features of the invention will be specified in the following description.

In the appended drawings which are given solely by way of example:

Fig. 3 is a section on the line III—III of Figure 2.

Fig. 4 is a half-section on the line IV—IV of Figure 3.

In the construction herein represented, A′ is the general vehicle body and M a device consisting of a valise-holding box or trunk and a spare wheel carrier.

The said box comprises in particular a balanced swinging panel or board C which supports the spare wheel carrier E and is pivoted on an axle B which is independent from the box M proper and is mounted upon two brackets A whereby the said box is supported by the vehicle frame.

Figure 1:
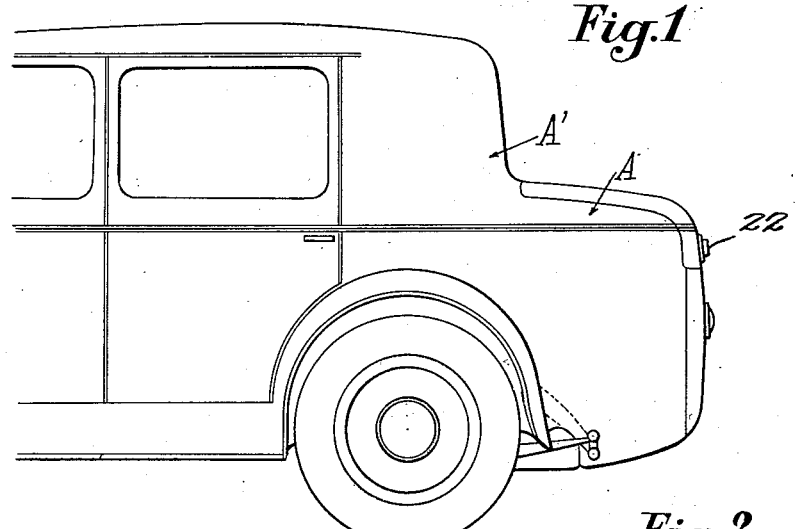
Fig. 1 is a side view of the rear part of a motor vehicle provided with the arrangement according to the invention.

According to the invention, the said valise-holding box M and the spare wheel carrier E, as well as the wheels 8 supported by the latter, are disposed in a main box or case A¹ forming part of the vehicle body. The side walls of said case A¹ consist of two side panels 9 of the vehicle body A which are extended to the rear for this purpose. The two panels 9 are pressed into shape at their lower part (Figs. 1, 2 and 3) so as to be connected tangentially with a sheet metal piece 10 of suitable shape which forms a stationary casing and mud guard and protects the interior of the case A¹ from all splashing of mud. The width of the said casing is sufficient to permit the rocking system, comprising the rear panel C, the spare wheel carrier E and the spare wheels 8, to pivot freely on the axle B.

The case A¹ is closed at the back by a pressed removable panel or cover 11 which is held in place by a nut 12 which serves at the same time to secure the spare wheels 8 to their carrier E. The said case A¹ is further closed by a cover 13 which is hinged at 14 and which in the closed position extends over the upper edge of the said rear panel 11 of the case A¹. The cover 13 also serves as a cover for a tool box G which is provided at the upper part of the valise-holding box M. The rear part 15 of the said cover 13 serves to support various signalling or indicating devices 22 required by the rules, such as back lantern, signal device, license plate, or the like.

In the example shown in Figure 3, the wheels 8 are enclosed upon almost the whole of their periphery in a circular case 8ª which is secured to the rocking panel C of the box M.

To provide the maximum width for the valise-holding box M, the back 16 of the rear seat 17 of the vehicle may be recessed as shown in Fig. 3. The partition between the box M and the back seat 16 consists of a sheet metal plate 17ª. Due to this increased width of the lower part of the said box M, it is now possible either to lodge in the latter valises of larger size, the overhang of the wheel carrier remaining the same, or to reduce the said overhang by the use of valises of small size.

Figure 2:
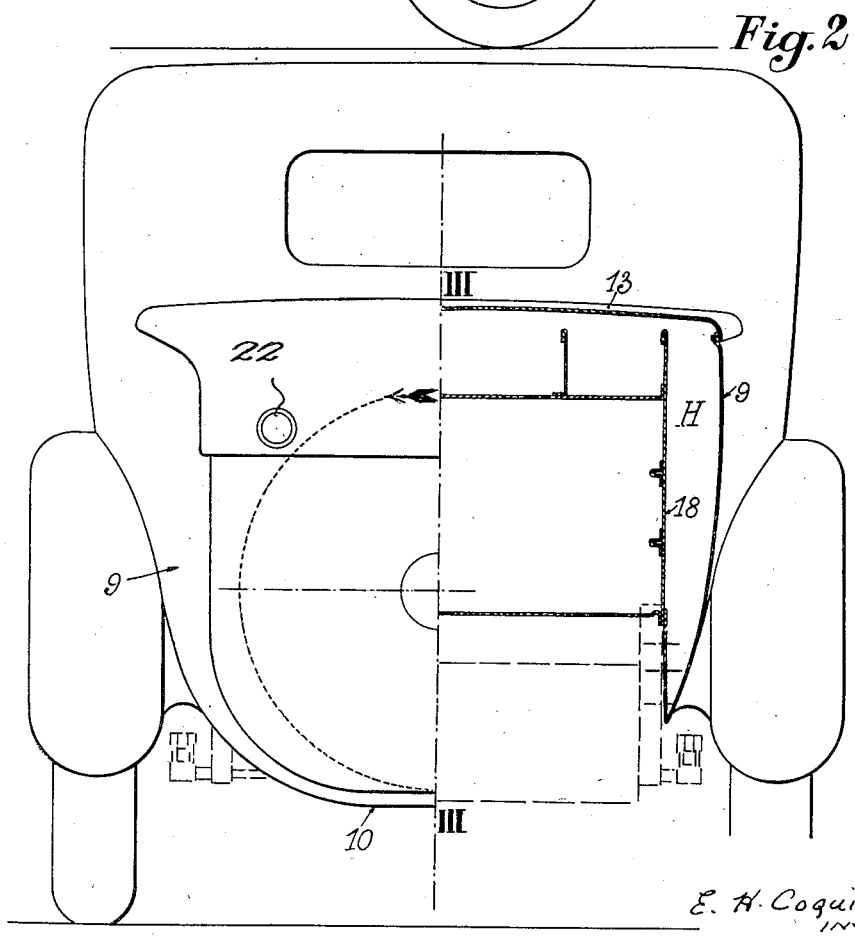
Fig. 2 is a rear view corresponding to Figure 1, with a partial section on the line II—II of Figure 3.

As shown in Figures 2 and 4, the box M is narrower than the main box or case $A^1$. For the better use of the space between the sides 18 of the box M and the case $A^1$, the sides 18 are extended to the rear and are connected with the rear ends of the side walls of the case $A^1$, thus forming two compartments H, in which may be placed various objects of elongated shape such as canes, golf clubs and the like.

The aforesaid arrangement is completed by the addition of a shock protector 19 which is secured, by means of brackets 20, to the above described rocking system; said brackets are preferably mounted on pivot pins 21 situated in the axle B for said system, so that when the box M is opened, the shock protector will pivot about, together with the rear panel C, thus affording a ready access to the valises.

Obviously, the invention is not limited to the construction herein described and represented, which is given by way of example. For instance, the rear pressed panel 11 of the case $A^1$ may be hinged to the casing 10 instead of being removable. In the case in which the said panel is not thus hinged, it may be secured by other means than the clamping nut 12.

Having now described my invention what I claim as new and desire to secure by Letters Patent is:

1. In a luggage and like carrier arrangement for motor vehicles, a case formed integral with and at the rear of the vehicle body and adapted to open at the rear and a trunk and spare wheel carrier structure within said case and supported by the vehicle frame, the rear wall of said trunk being adapted to pivot about a horizontal axis and the spare wheel carrier being attached to said rear wall.

2. In a luggage and like carrier arrangement for motor vehicles, a case formed integral with and at the rear of the vehicle body and opening at the rear, a trunk structure within said case and supported by the vehicle frame and including a rocking rear wall, a spare wheel support attached to said rear wall and comprising means for locking the spare wheels thereupon and a removable wall for closing said case at the rear and adapted to be held in place by said locking means.

3. In a luggage and like carrier arrangement for motor vehicles, a case formed integral with and at the rear of the vehicle body and opening at the rear, a trunk and spare wheel carrier structure within said case and supported by the vehicle frame, the rear wall of said trunk being adapted to pivot about a horizontal axis and to carry the spare wheel carrier, a removable wall for closing said case at the rear and a hinged cover for closing the top of said case.

4. In a luggage and like carrier arrangement for motor vehicles as claimed in claim 1, the further feature residing in the provision of a shock protector adapted to pivot together with said rear wall of the trunk.

In testimony whereof I have signed my name to this specification.

EMILE HENRI COQUILLE.